United States Patent [19]

Kuhn et al.

[11] Patent Number: 5,431,131
[45] Date of Patent: Jul. 11, 1995

[54] CAMSHAFT FOR INTERNAL COMBUSTION ENGINES

[76] Inventors: Peter Kuhn, Prenkelstrasse 61, D-6940 Weinheim; Mario Berg, Lindenstrasse 40, D-6823 Neulussheim; Gerhard Kachel, Weltzienstrasse 7; Helmut Schon, Rheingoldstrasse 2, both of D-7500 Karlsruhe, all of Germany

[21] Appl. No.: 244,021

[22] PCT Filed: Nov. 15, 1992

[86] PCT No.: PCT/DE92/00954
§ 371 Date: May 13, 1994
§ 102(e) Date: May 13, 1994

[87] PCT Pub. No.: WO93/10336
PCT Pub. Date: May 27, 1993

[30] Foreign Application Priority Data

Nov. 19, 1991 [DE] Germany .............. 41 37 978.0

[51] Int. Cl.⁶ .................................................. F01L 1/04
[52] U.S. Cl. ................................. 123/90.6; 74/567; 29/888.1; 251/251
[58] Field of Search .................... 123/90.6; 74/567; 29/888.1; 251/251

[56] References Cited

U.S. PATENT DOCUMENTS

| 2,872,227 | 2/1959 | Wachs . | |
|---|---|---|---|
| 3,516,394 | 6/1970 | Nichols | 123/90 |
| 4,072,448 | 2/1978 | Loyd, Jr. | 123/90.6 |
| 4,620,356 | 11/1986 | Maus et al. | 74/567 |
| 4,871,327 | 10/1989 | Ridgway et al. | 439/543 |
| 5,009,123 | 4/1991 | Hiraoka et al. | 74/567 |

FOREIGN PATENT DOCUMENTS

| 3206791 | 11/1983 | Germany . |
| 3317019 | 11/1984 | Germany . |
| 3943426 | 4/1991 | Germany . |

Primary Examiner—Henry C. Yuen
Assistant Examiner—Weilun Lo
Attorney, Agent, or Firm—Baker & Daniels

[57] ABSTRACT

The present invention provides a disassemblable camshaft for internal combustion engines features a cylindrical shaft which in a single operation can be inserted in the bearing bores and cams arranged in between, so that undivided bearings of relatively small diameter can be used. The cams are joined in rotationally fixed fashion to the shaft by pinch-fitting them on the shaft. Transverse screw joints utilizing tensionally stressed clamping screws improve the fixed joint between the cam and both the conic sleeve and shaft. The screw joints are fashioned in a manner such that no additional construction space is needed as compared to conventional camshafts and assembly can be performed with only standard tools.

25 Claims, 5 Drawing Sheets

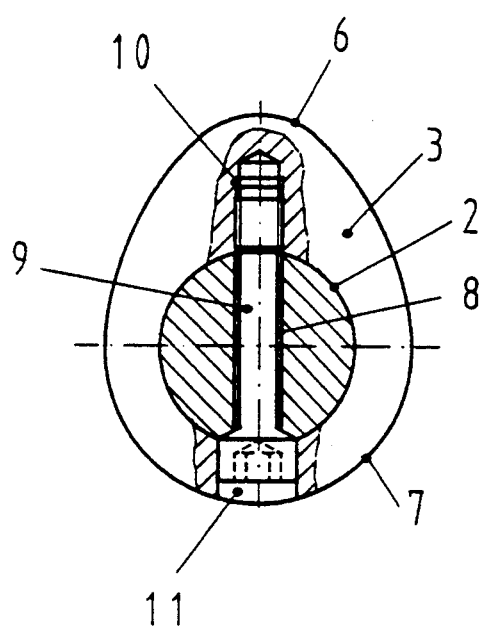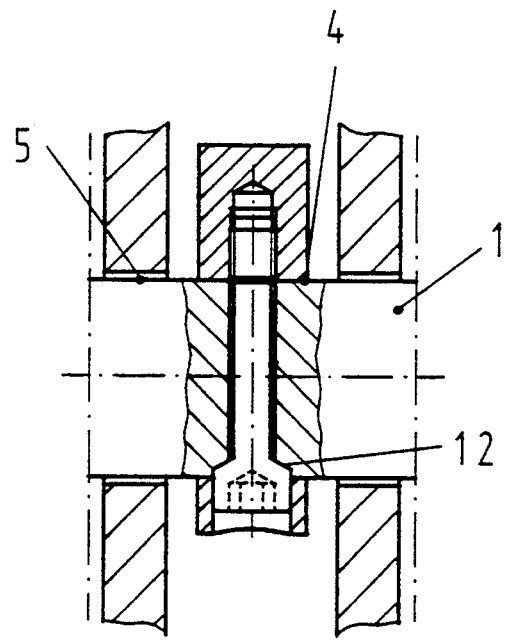
Fig. 1(a)　　　　　　Fig. 1(b)
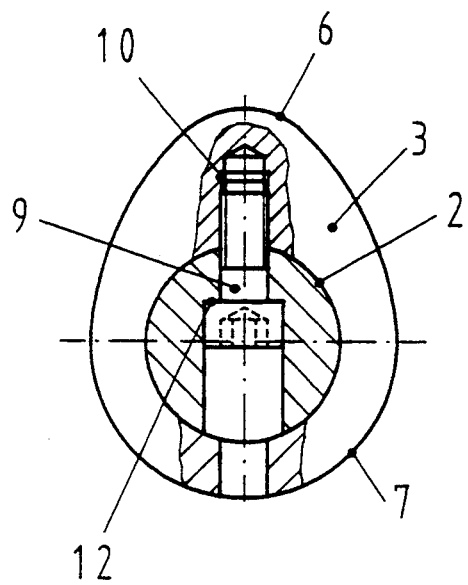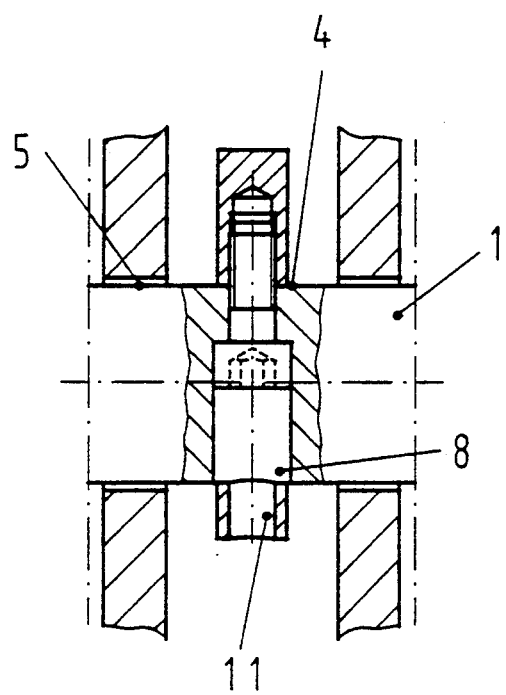
Fig. 2(a)　　　　　　Fig. 2(b)

CAMSHAFT FOR INTERNAL COMBUSTION ENGINES

BACKGROUND OF THE INVENTION

The present invention relates to a camshaft for internal combustion engines, and more particularly to a camshaft in which the cams are attached by screws.

The camshaft of an engine normally supports several cams. Between the cams, the camshaft must be supported by bearings. With conventional, undivided bearings the camshaft needs to be slipped axially into the casing and, for reasons of assembly, must at the bearing points have at least the diameter on which the cam apexes revolve. Bearing diameters of that size result in high bearing friction, substantial bearing backlash with correspondingly inaccurate guidance of the camshaft, and excessive construction space requirements in the region of the bearings.

When giving the camshaft at the bearing points a considerable smaller diameter for load-bearing reasons, friction and backlash problems turn out to be considerably more favorable. But the camshaft must then be installed radially, which calls for divided bearings having considerably higher engineering expense. Owing to the necessary screw joints, the construction space requirement tends to be higher than it is with integral bearings.

The disadvantages of the above two camshafts bearing support designs also occur with assembled camshafts, where individual cams with a single cam nose each are pinch-fitted on a shaft or secured to the shaft by hydraulic expansion. The advantage of such assembled camshafts resides in the option of using different materials for the shaft and for the cams.

The use of undivided bearings with a small diameter is obviously possible only with a camshaft allowing disassembly, with the shaft being able to be axially inserted, in the bearing bores and in the cams arranged between the bearings. This offers at the same time the advantage that different materials may be used for shaft and cams.

German Patent Document DE 33 17 019 describes a control shaft in large-scale engine building, that enables pinch-fitting of cams on a cylindrical shaft by means of conic sleeves, which both with the shaft and the cams enter into a compression joint.

While the construction space requirement in the radial direction may be viewed as limited, it tends to increase in axial direction as compared to the conventional solution. For one, the conic sleeve itself must have a sufficient length for centering the cam nose and for the safe transmission of the torque, and for another there is an axial stop required for the sleeve, in order to prevent the cam from jumping off the cone as hydraulic fluid is introduced to achieve a definitive fit. This sets limits to the use of this solution in more compact internal combustion engines, for instance passenger car engines.

Further disadvantages of the solution described in German Patent Document DE 33 17 019, however, evidence themselves especially in the expensive assembly operation. Specifically, an unequivocal and sufficiently accurate positioning of the cams in an axial direction as well as in a peripheral direction is possible only with appropriate assembly devices.

German Patent Document DE 39 43 426 describes a camshaft where cam elements are each secured on a smooth shaft by a cylindrical cross pin. Since in production it is difficult to measure and ream the cross bore in the cam element together with the cross bore in the shaft after installation of the cam element, very high tolerance requirements are needed on the positional accuracy of the separately machined bores. Additionally, owing to the relatively small nominal dimension, extremely small diameter tolerances must be specified both for the bores and the pin. Both such specifications lead to very high manufacturing costs. Additionally, with the cross pin attached, it is not possible to maintain a surface pressure between the surface of the shaft and the bore in the cam element. Therefore, the changing torque is transmitted strictly positively, and alternating bending deformation of the transverse pin that leads to constant relative motions and reduced durability of the joints.

SUMMARY OF THE INVENTION

The present invention provides a camshaft to which the cams are attached. Radial tightening of the cams on the shaft is accomplished by means of at least one clamping screw which is arranged in the region of the cam subject to tension stress. The clamping screws subject part of the circumference of the joint between shaft and cam to a pressure which is sufficient to transmit the torque essential for a friction fit. On the remaining periphery of the joint, the joint may, across an angular range of more than 180°, be fashioned with a gap, so that sufficient threading lash is provided. Insertion of the clamping screws effects a form fit which results in correct positioning of the cam on the camshaft. The clamping screws can be tightened with simple standard tools. Lastly, the solution according to the invention requires no extra construction space, since the internal threading pertaining to a clamping screw each is located in the cam nose interior.

An advantage of the present invention is that it provides a design which enables an easy and quick axial insertion of the shaft in the bearing while at the same time threading the cams and, that results automatically in the correct positioning of the cams.

Another advantage of the present invention is that the cams are quickly tightened to the shaft with standard tools.

Yet another advantage of the present invention is that space needs do not exceed those of conventional solutions but which allows for economic fabrication while transmitting the alternating torque applied to the cams safely.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein:

FIGS. 1(a) and 1(b) illustrate one embodiment of the invention in two views;

FIGS. 2(a) and 2(b) illustrate an alternate embodiment of the invention of FIG. 1 in two views showing the screw head located within the cam;

Corresponding reference characters indicate corresponding parts throughout the several views. The exemplification set out herein illustrates preferred embodiments of the invention and such exemplifications are not to be construed as limiting the scope of the invention in any manner.

DETAILED DESCRIPTION OF THE INVENTION

Figure 3:
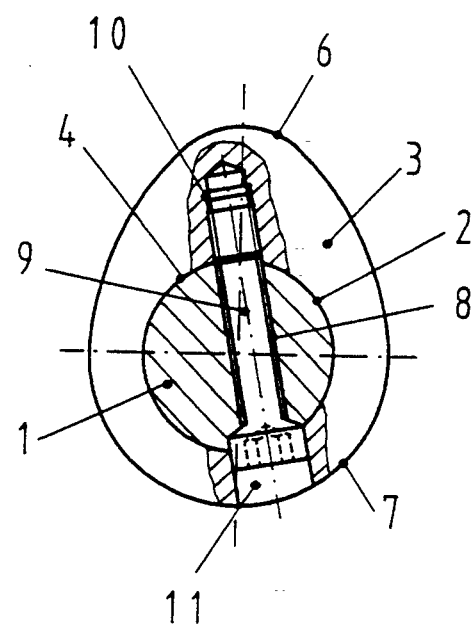
FIG. 3 is a fragmentary sectional view of another alternate embodiment showing eccentric positioning of the clamping screw.

All of the embodiments of the invention feature a nonstepped cylindrical shell surface 2 on cam shaft 1, the latter forming in the region of each cam 3 within an attachment bore a clamping surface 4 for its mounting and forming in the region of each bearing a journal surface 5. The above shape of the shell surface is the simplest possible and enables easy installation of the cams. Cam 3 features a nose 6 and an essentially or substantially circular area 7 surrounding the shaft. The shaft is axially inserted into the attachment bore. Located in the region of cams 3, cross bores 8 are provided in shaft 1 to accommodate clamping screws 9 which are subject to tensional stress. Internally threaded bores 10 include internal threadings that are coordinated with the clamping screws and are located in the cam nose interior, so that the cams are forced down on the shell surface of the shaft in the region of the cam nose when screws 9 are tightened. This is advantageous because the operating forces must be transmitted in the region of the cam nose between the inside wall of a cam and the shell surface of the shaft. The clamping screws keep these regions prestressed.

The new position of the internal threadings, furthermore, is favorable because the cam nose interior requires no additional construction space for the threaded parts. Provided in the ring-shaped region 1 of the cams is a coaxial bore or recess 11 coaxial with internally threaded bore 10. Coaxial bore 11 is required for cutting the internal threading and through which extends the stem of the clamping screw if the screw head bears on the circular region of the cam, and through which a wrench must be passed if the screw head is located in the shaft interior. Alternatively, the screw head may be located in coaxial bore or recess 11 when the screw head bearing surface on the shaft is situated in the region of its shell surface. Preferably, clamping screw 9 is a cap screw since a stud bolt would need to be inserted separately, with the cams already located in their locations.

FIG. 1 shows a first relatively simple embodiment of the invention. The head bearing surface 12 for the clamping screw is located on the shaft in the region of its shell surface. The screw head protrudes beyond the shell surface outwardly and is situated in the coaxial bore or recess 11 in coaxial alignment with the internally threaded bore to produce a positive interference fit with the cam. The head of the clamping screw is fashioned as a socket head. Heads featuring an external profile would be considerably more difficult to accommodate, and their form fit with the cam would not be easy to establish. The form fit between the screw head and the cam, of course, must have minimal backlash. No additional friction must occur on the head either, however, since it would adulterate the prestress force of the clamping screw despite a correct tightening torque. Therefore, a fit with little backlash is called for. The head bearing surface of the clamping screw is conic in this embodiment, because the head is centered thereby and a centering collar on the stem of the screw is dispensable. Thus, the screws 10 can be fitted, continuously from the head to the threading, with the cross section of the threading used, which is optimal for maintaining a maximally high screw prestress.

The described embodiment presupposes that the cam nose is in an axial direction wider than the socket head of the clamping screw. In the case of engines with limited axial construction space this may mean a decisive limitation. This problem is solved in a second embodiment as shown in FIG. 2, in that the head bearing surface 12 for the clamping screw 9 is situated in the interior of shaft 1, with the cross bore 8 (viewed from the head bearing surface 12) toward the cam nose 6, requiring a diameter which is somewhat larger than the threading diameter of the clamping screw, while in the direction of the substantially circular region 7 of the cam, the cross bore diameter needs to be somewhat larger than the head diameter. With this variant, the length of the clamping screw is limited to somewhat less than the shaft diameter, because the clamping screw must completely interfit in the shaft when it is slipped through the cam. In the described embodiment, the bore coaxial with the internal threading, must only be just large enough to allow cutting the internal threading and the passing of a suitable wrench.

Cam noses for the intake/scavenging control in internal combustion engines are asymmetric in some engines, i.e., the approach flank and the leaving flank have different contours. Switching the flanks by reverse assembly of a cam on the shaft leads to improper operation of the engine. The problem of safely preventing defective assembly of the above type can be solved by eccentric positioning of the clamping screws 9, cross bores 8, internally threaded bore 10, and coaxial bore or recess 11. This is illustrated in FIG. 3 on the example of a variant of the embodiment according to FIG. 1.

When fashioning the cam inside wall facing the shaft as a plain cylindrical bore, its diameter must be somewhat larger than the shaft diameter. The easy assembly of the camshaft of the invention could not be achieved in any other way. Envisioning the cam as rigid, the inside wall (i.e., the attachment bore) of the cam then makes contact with the shaft only at one spot of its circumference, and this contact coincides with the screw axis. But with the direction of the force transmitted by the cam to the shaft changing constantly during the operation of the engine and deviating from the contact normal achieved in an assembled state, a constant change of the contact normal position occurs, i.e., constant reciprocation during operation or travel of the contact point on the shell surface of the shaft occurs. In the long run, this action would inevitably destruct the components.

Figure 4A:
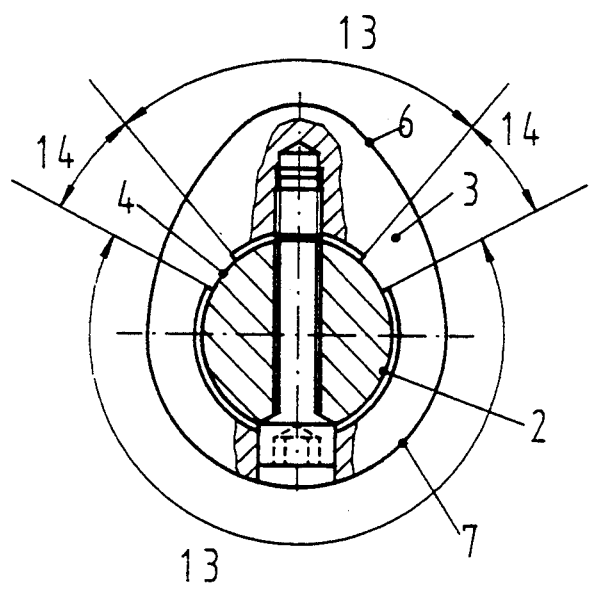
FIGS. 4(a) and 4(b) illustrate another embodiment of the invention showing in two views a gap formation to reduce cam displacement during operation.
Figure 4B:
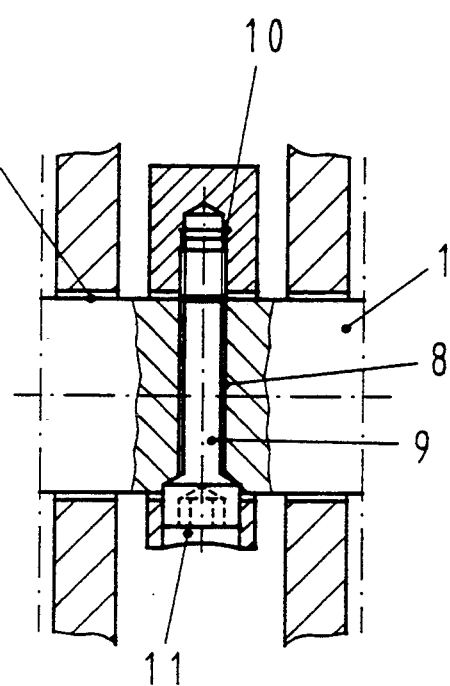

This possibility is eliminated in a variant of the described embodiment relative to FIG. 1 as illustrated in FIG. 4, by fashioning the inside wall of the cam (i.e., attachment bore) in such a way that the contact between the inside wall of the cam and the shell surface of the shaft is established at two points in two spaced angular areas 14 on the shaft circumference. Thus, there exist two normal contacts which inscribe an angle, so that any operational force can be absorbed by alteration of the contact forces and no displacement of the contact point will occur. In those angular areas 13 in which no contact is meant to be established between cam and shaft, the inside surface of the camshaft is relative to the shell surface of the shaft backed off under a gap formation. Such backing off over an angle of more than 180° on the cam side opposite the cam nose provides additionally a distinct cam backlash on the shaft before assembly of the clamping screw, thus ensuring an easy assembly of the camshaft.

Figure 5A:
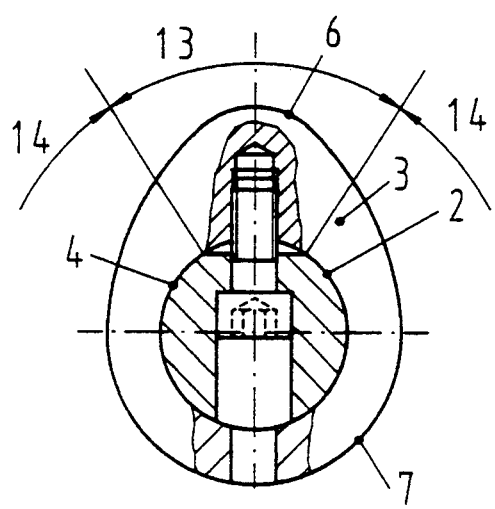
FIGS. 5(a) and 5(b) show a variant of the embodiment of FIG. 2, in two views, also showing the gap formation in one form of the invention.
Figure 5B:
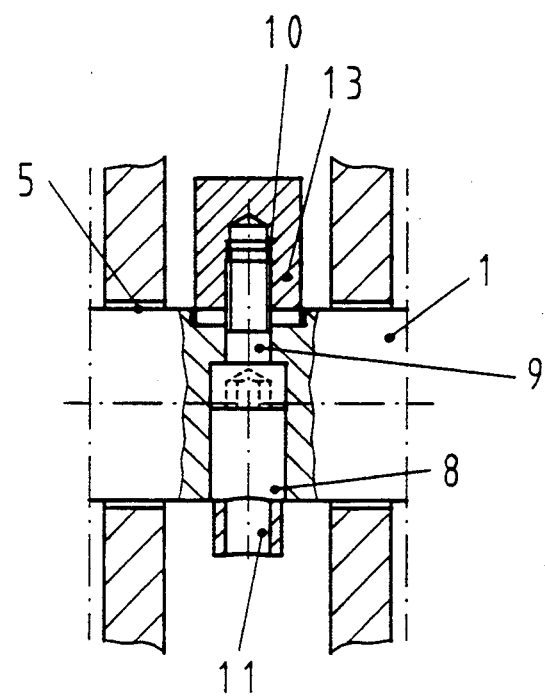

Similarly, as illustrated in FIG. 5 with the aid of a variant of the embodiment relative to FIG. 2, the shaft 1 can be backed off under gap formation locally, i.e., only in the area 13 of the cams 3, in the manner described above, to obtain two normal contacts.

It is desired to fashion the inside of the cam facing the shaft as a plain cylindrical bore and the shell surface of the shaft as well cylindrical, the problem of converting the line contact in the area of the internal threading in the cam nose to a sufficiently wide pressure zone in the vicinity of the clamping screw, or even across the entire circumference, presents itself, so that any operating force will be absorbed only by changing the pressure distribution in the contact zone between the shell surface of the shaft and the inside surface of the cam, and not by a constant shifting of the contact normal.

This problem is solved by a variant of the illustrated embodiments by an adapted deformation of cam and shaft, in that the resistance of the shaft to compression is in a suitable measure reduced by using a hollow shaft. This allows the radius of curvature of the shaft, which for purposes of easy assembly is of necessity smaller than the radius of curvature of the inside surface of the cam, to adapt or flex, under the effect of the screw prestress in the area of the clamping screw, to the contour of the inside surface of the cam. Furthermore, the use of a hollow shaft is favorable because the bore in the shaft can be utilized as an oil duct, for instance for lubricating the bearings and the nose-and-follower contacts.

Figure 6C:
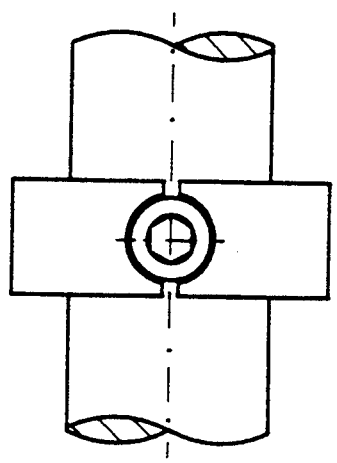
FIGS. 6(a)-6(c) illustrate another embodiment of the invention in three views showing a head bearing surface with applied tangential tension.
Figure 6A:
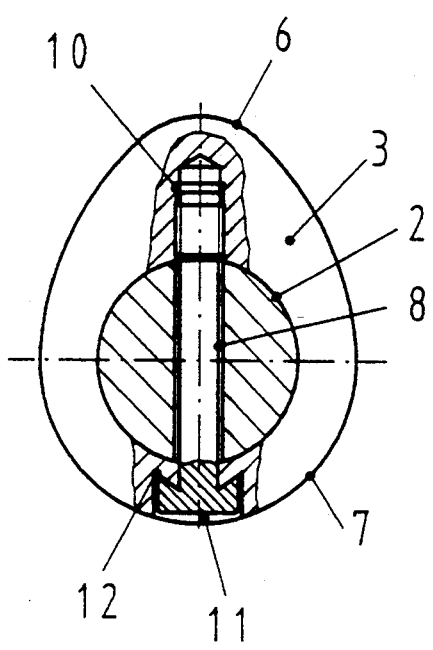
Figure 6B:
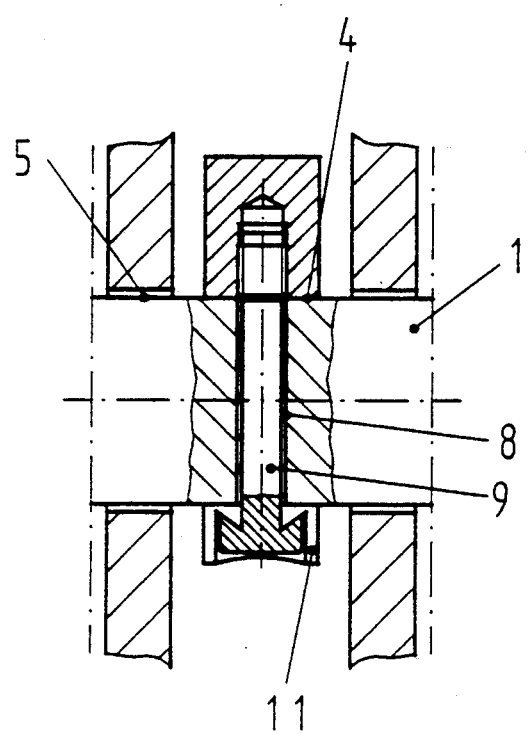
Figure 7D:
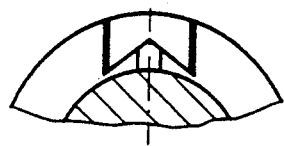
FIGS. 7(a)-7(d) show a variant of the embodiment of FIG. 6 with the addition of an adapter to provide tangential tension to the cam.
Figure 7C:
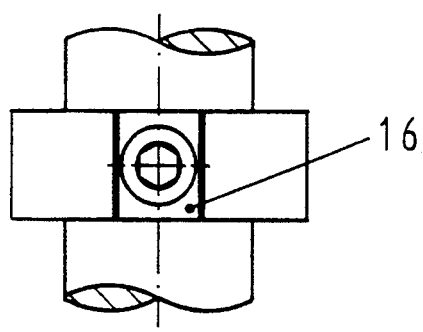
Figure 7A:
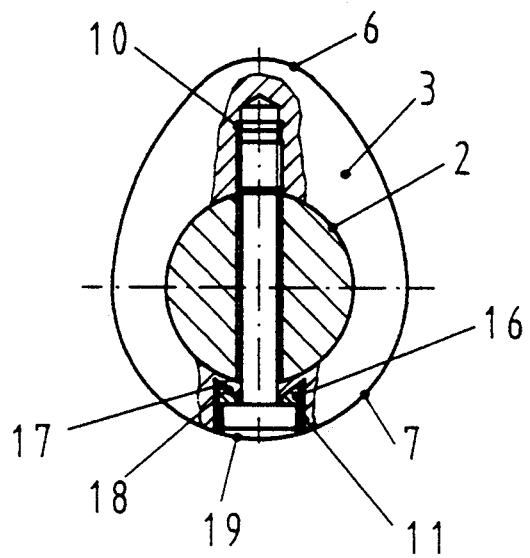
Figure 7B:
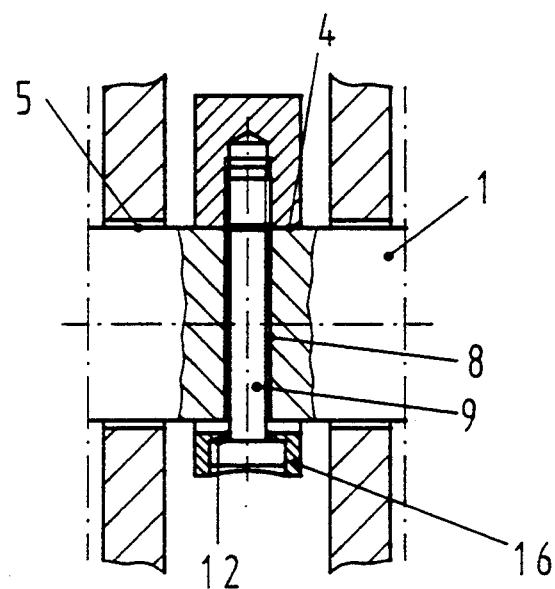

Another embodiment is illustrated in FIG. 6. Here, the same problem is solved in that the clamping screw prestress forces the cam on the shaft, in the area of the cam nose 6 and across the entire circumference, by introduction of tangential tension forces at the head bearing surface 12 in the circular area of the cam. This solution is characterized by a head bearing surface 15 which on the screw side is fashioned such that the head of the clamping screw overlaps the head bearing surface 12 on the cam completely or partly, and by a recess 11 in the essentially circular area of the cam that features the head bearing surface 12 fashioned in accordance with the screw head shape, through which recess extends the stem of the clamping screw and by which the cam is completely separated, i.e., split, at that point. With particular ease, as shown in FIG. 6, the head bearing surface may be given a conic design. The described recess, e.g., may be fabricated by the operations of machining a bore such as countersinking with a depth that decreases toward the center axis, and slotting the cam in the plane bounded by the shaft axis and the screw axis. The inside surface of the cam can be given the size of the shaft diameter. Easy assembly is thus assured by the radial yielding of the slotted cam with loosened clamping screws.

FIG. 7 shows a variant to the embodiment of FIG. 6 characterized by using an adapter 16 between the clamping screw and cam. One adapter end 17, facing the shaft, is so fashioned that it overlaps or extends over the bearing surface 18 in the plane of the cam completely or partly, the other adapter end 19 of which, away from the shaft, is fashioned to match the substantially circular area 7 of the cam, the interior on which is located a flat head bearing surface 12 for clamping screw 16. This adapter 16 is situated in a recess 11 which, for adapter 16, features the bearing surface 18 fashioned to match the shape of the adapter, through which the bearing surface extends the clamping screw stem, and through which the bearing surface the cam is at this point completely separated (i.e. split). The described recess is easy to fabricate, e.g., by the operation of machining a bore coaxial with the screw axis or machining in the direction of the shaft axis using a form cutter with a depth increasing toward the center or by slotting the cam longitudinally in the same direction.

All of the design variants of the invention enable the use of undivided bearings of small diameter by pinch-fitting the cams on a nonstepped cylindrical shaft by means of a transverse screw joint which, e.g., in the simplest manner can be tightened respectively loosened again with a hex wrench. The screw joints are fashioned in such a manner that, as compared to conventional camshafts, there is no additional construction space required and that a simple positioning of the cams is possible in the assembly, without the use of additional devices.

What is claimed is:

1. A disassemblable camshaft for an internal combustion engine, said camshaft comprising:
   a shaft with a nonstepped cylindrical shell surface, said shaft having a cross bore;
   at least one pinch-fitted cam having a nose with an internally threaded bore, an attachment bore into which said shaft shell surface interfits forming a clamping surface for mounting the cam, a substantially circular area opposite said nose and surrounding said shaft, and a bore in the circular area coaxial with said internally threaded bore in said nose; and
   a clamping screw subjected to tensional stress disposed through said coaxial bore, said cross bore and said internally threaded bore in said cam.

2. The camshaft of claim 1 in which said clamping screws are cap screws.

3. The camshaft of claim 2 in which said clamping screws include a socket cap.

4. The camshaft of claim 2 in which said clamping screws include a head and threaded section connected by a stem, said stem diameter constant between said head and said threaded section, said stem diameter smaller than said threaded section diameter.

5. The camshaft of claim 4 in which each said clamping screw includes a head bearing surface arranged on said shaft in the area of said shell surface, said head of said clamping screw protrudes outwardly beyond said shell surface of said shaft.

6. The camshaft of claim 5, in which said clamping screw head includes a cylindrical outside surface that forms a fit with substantially little backlash, said coaxial bore disposed in the substantially circular area of a cam.

7. The camshaft of claim 5 in which said head bearing surface is of conic shape.

8. The camshaft of claim 2 in which each said clamping screw includes a head bearing surface arranged to fit within said interior of the shaft.

9. The camshaft of claim 8, in which said coaxial bore has a diameter which is smaller than the diameter of said head bearing surface of a clamping screw.

10. The camshaft of claim 1 in which said shell surface in the area of said clamping surface includes a gap formation region, so that said attachment bore of said cam facing said shaft bears only in particular angular areas on the circumference of said shell surface of said shaft.

11. The camshaft of claim 10 in which said gap formation causes said cam to bear at two angular areas on both sides of said internally threaded bore.

12. The camshaft of claim 1 in which the said attachment bore bears on said shell surface of the shaft only in specific angular areas of the circumference of said shell surface and includes a gap formation in an intervening angular area.

13. The camshaft of claim 12 in which said attachment bore is fashioned that it bears in two angular areas on both sides of said internally threaded bore on the shaft.

14. The camshaft of claim 12 in which said attachment bore in the substantially circular area uninterruptedly includes a said gap formation across an angular area of more than 180° relative to said shell surface.

15. The camshaft of claim 2 in which each said clamping screw includes a head bearing surface located in the substantially circular area of a said cam.

16. The camshaft of claim 15 in which each said cam includes a rotationally symmetric head bearing surface not situated in a plane oriented such that said clamping screw head at least partly overlaps said head bearing surface on the cam.

17. The camshaft of claim 15 in which said substantially circular area includes a recess, said bearing surface fashioned to match said screw head and through which extends said clamping screw.

18. The camshaft of claim 17 in which said substantially circular area is separated from said screw head by said recess.

19. The camshaft of claim 2 further comprising an adapter having an interior flat head bearing surface clamping screw, said adapter disposed between said screw head and said cam.

20. The camshaft of claim 19 in which said cam includes a bearing surface, said adapter includes an end facing said shaft fashioned to at least partly overlap the bearing surface in the plane of the cam.

21. The camshaft of claim 20 in which said end of the adapter faces toward the shaft to match the substantially circular area.

22. The camshaft of claim 20 in which a cam includes a recess into which said adapter bearing surface is adapted to match the shape of said adapter, and through which extends said clamping screw.

23. The camshaft of claim 22 in which said substantially circular area is separated from said screw head by said recess.

24. The camshaft of claim 1 in which said cross bores, clamping screws, internally threaded bores and coaxial bores are eccentric in relation to a shaft center axis.

25. The camshaft of claim 1 in which said shaft is hollow.

* * * * *